Oct. 28, 1969    J. MARCOVITCH    3,474,652
ROLLING OF CYLINDRICAL WORKPIECES
Filed May 1, 1967    2 Sheets-Sheet 1

INVENTOR
JACOB MARCOVITCH
By Young + Thompson
ATTYS.

Oct. 28, 1969
J. MARCOVITCH
3,474,652
ROLLING OF CYLINDRICAL WORKPIECES
Filed May 1, 1967
2 Sheets-Sheet 2
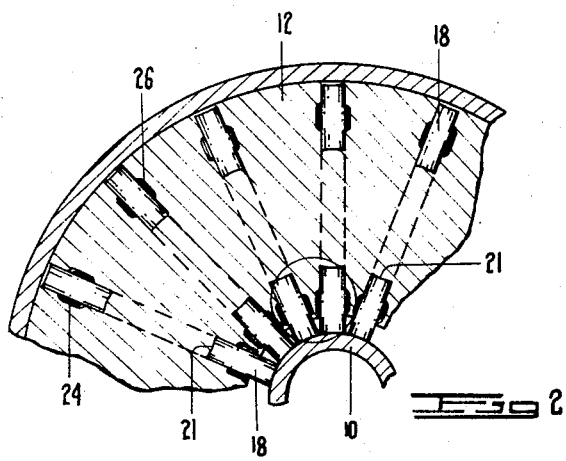
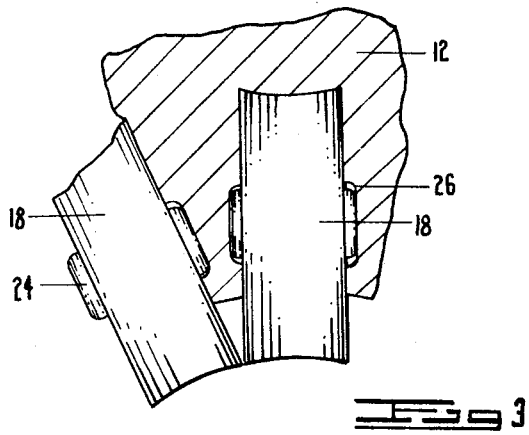
INVENTOR
JACOB MARCOVITCH
BY Young + Thompson
ATTYS.

3,474,652
ROLLING OF CYLINDRICAL WORKPIECES
Jacob Marcovitch, Johannesburg, Transvaal, Republic of South Africa, assignor to Rotary Profile Anstalt, Vaduz, Liechtenstein
Filed May 1, 1967, Ser. No. 634,946
Claims priority, application Republic of South Africa, May 5, 1966, 66/2,610
Int. Cl. B21b 17/14, 21/00; B21c 1/C0
U.S. Cl. 72—190
3 Claims

ABSTRACT OF THE DISCLOSURE

A die for reducing the diameter of a cylindrical workpiece has multiple channels radiating from the die orifice, each constituting a race for an endless succession of small rollers, and the plane of each being substantially parallel with the axis of the die, rollers at the orifice forming a lining in rolling contact with the workpiece.

---

Figure 1:
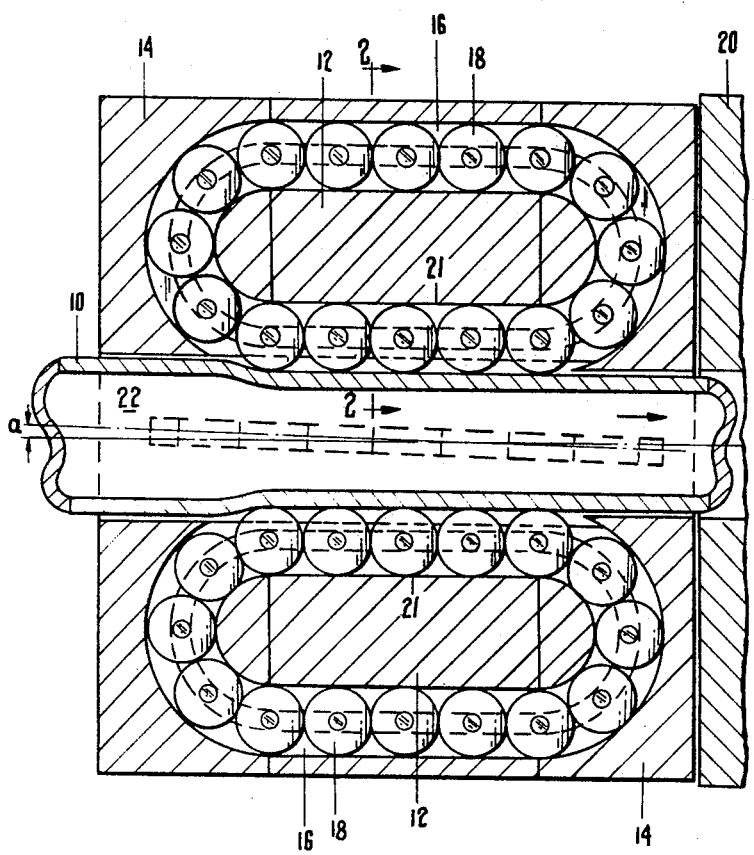

This invention relates to the treatment of cylindrical workpieces, which may be solid or hollow to reduce them in diameter and to provide a surface finish which is acceptable commercially. Usually, this is effected by drawing or extruding the workpiece through a solid die.

The object of the present invention is to provide a means for reducing the workpiece which produces a better finish than is obtained by conventional means and which avoids the disadvantage of drawing or extruding techniques that the diameter of the workpiece varies in size and sometimes deviates from circularity by reason of wear of the dies.

According to the invention, apparatus to reduce cylindrical workpieces in diameter consists of a die composed of a housing defining the die orifice, the housing providing multiple channels radiating from the die orifice and each constituting a race for an endless succession of small rollers of concave profile to conform with the required circumference of the finished workpiece, the channels lying in planes substantially parallel with the axis of the die orifice; and being close together at their inner bights for rollers within the bights to form a lining for the die orifice; and means to draw a workpiece through the orifice.

An embodiment of the invention is illustrated in the accompanying drawings, in which FIGURE 1 is a vertical section, FIGURE 2 is a fragmentary section on the line 2—2 of part of FIGURE 1, and FIGURE 3 is an enlarged view of the circled area of FIGURE 2.

In the drawings, the workpiece is a tube 10, but it could also be solid. For most materials, particularly tubes, the operation is carried out in the cold.

The die consists of a housing 12 which has removable ends 14 to give access to the radiating channels 16 which are formed within the thickness of the housing. The channels lie in planes that may be parallel with the workpiece but are preferably slightly inclined to the tube axis at a small angle which is shown at "a" in FIGURE 1.

Each channel is a race for an endless succession of small rollers 18, each of which is concave in profile (see FIGURE 3) so that it has the contour necessary to conform to the circumference of the finished workpiece, slight "skewing" of the rollers, stated above to be desirable, calls for a very slight hyperbolic modification in the contour.

The channels, at their radially inner bights 21, at the die orifice 22, lie sufficiently closely side by side for the rollers 18 that are, for the time being within the bights, to form a lining for the orifice that is substantially continuous.

The workpiece and die are movable relatively to each other. Preferably, the die is fixed in space, for instance by abutting against an annular stop 20, through which the workpiece passes.

The rollers are held in the channels as they pass through the orifice by the workpiece itself, but, in order that they should not fall from the channels when no workpiece is in the orifice, they are formed with stub axles 24 that move in grooves 26 in the side walls of the channels. Alternatively, the stub axles could be dispensed with, and the rollers held in the grooves magnetically, for instance by electrically magnetising the housing 12.

In use, the workpiece is offered to the orifice. It may be forced through it, but preferably the end is reduced in diameter so that it passes easily through the orifice and the stop 20, to be gripped by a chuck or other holding device, which pulls on the workpiece to draw it through the die. The passage of the workpiece through the orifice causes the rollers in the channels to circulate continuously around their channels, so that each roller in turn enters the orifice, passes through it, and leaves it to pass around the channel and then re-enters the orifice again. The workpiece, during its passage, is compacted and elongated. As the contact between the rollers and the workpiece is a rolling contact, a good surface finish is imparted to the workpiece. Also, since the lining of the orifice is being continuously changed, there is a much slower rate of wear than in the conventional die, and, in any case, as the contact is rolling contact, there is inherently less wear because there is theoretically no frictional contact between the orifice and the workpiece.

It is pointed out that, when there has been wear sufficient to upset the diameter of the workpiece, the rollers may easily, quickly and cheaply be replaced by withdrawing an end 14 from the housing to give access to the channels.

The housing should preferably be made of a material harder than the material of the rollers, or the channels lined with a harder material, so that wear is preponderantly taken by the rollers which are more easily and cheaply replaceable than is the housing.

I claim:

1. In a die for reducing the diameter of a workpiece having a cylindrical outer surface, which die comprises rigid support means having formed therein a plurality of endless tracks that converge to a central portion where they surround a working aperture; and a plurality of work rollers lining and freely movable in the tracks, and having working surfaces that, when the work rollers are supported by the support means in the central portion of the tracks, define a throat through which a workpiece may be worked by the work rollers; the improvement that the rollers are narrow in relation to the diameter of the throat and have smoothly curved concave working surfaces; and that the rollers at the central throat work on substantially the whole surface of the workpiece.

2. The die of claim 1 in which the planes of the tracks are slightly inclined to the axis of the orifice.

3. The die of claim 1 in which the rigid support means has a detachable part to give access to the tracks.

References Cited

UNITED STATES PATENTS

| 802,048 | 10/1905 | Lambert et al. | 72—190 |
| 2,565,780 | 8/1951 | Offutt | 72—190 |
| 2,568,730 | 9/1951 | Guthmann | 72—178 |
| 2,792,799 | 5/1957 | Dahlstrom | 72—190 |
| 2,948,324 | 8/1960 | Penrose | 72—178 |

MILTON S. MEHR, Primary Examiner